United States Patent [19]

Gillingham et al.

[11] Patent Number: 4,819,549
[45] Date of Patent: Apr. 11, 1989

[54] END SEAL FOR CLEAN ROOM CEILING SUPPORTS

[75] Inventors: Gary R. Gillingham, Prior Lake; Joseph C. Tokar, Apple Valley, both of Minn.

[73] Assignee: Donaldson Company Inc., Minneapolis, Minn.

[21] Appl. No.: 152,634

[22] Filed: Feb. 5, 1988

[51] Int. Cl.⁴ ............................................. B01D 46/00
[52] U.S. Cl. ................................... 98/1; 52/664; 52/127.4; 55/355; 55/502; 403/265; 403/346
[58] Field of Search ............... 55/355, 483, 484, 502, 55/385 A, DIG. 31; 52/664, 666, 127.4; 403/265, 268, 346; 98/31.5, 31.6, 33.1, 34.5, 34.6, 40.05, 40.1, 40.11, 1

[56] References Cited

U.S. PATENT DOCUMENTS

| 2,792,906 | 5/1957 | Evans . | |
|---|---|---|---|
| 4,031,677 | 6/1977 | Tantlinger | 403/266 X |
| 4,178,159 | 12/1979 | Fecteau | 55/385 A |
| 4,233,044 | 11/1980 | Allan | 55/355 |
| 4,461,205 | 7/1984 | Shuler | 55/505 X |
| 4,511,380 | 4/1985 | Fetter | 55/355 |
| 4,555,255 | 11/1985 | Kissel | 55/355 |
| 4,608,066 | 8/1986 | Cadwell, Jr. | 55/385 A |
| 4,639,261 | 1/1987 | Pittman et al. | 55/502 |
| 4,671,811 | 6/1987 | Cadwell, Jr. et al. | 55/355 |
| 4,678,487 | 7/1987 | Cadwell, Jr. et al. | 55/385 A |
| 4,693,173 | 9/1987 | Hashimoto | 98/31.5 |
| 4,693,175 | 9/1987 | Hashimoto | 98/31.6 |
| 4,699,640 | 10/1987 | Suzuki et al. | 55/385 A |
| 4,710,208 | 12/1987 | Ziemer et al. | 55/355 |
| 5,518,405 | 5/1985 | Lough et al. | 55/385 A |

FOREIGN PATENT DOCUMENTS

| 59-216612 | 12/1984 | Japan | 55/502 |
|---|---|---|---|
| 61-18416 | 1/1986 | Japan | 55/502 |

Primary Examiner—Harold Joyce
Attorney, Agent, or Firm—Merchant, Gould, Smith, Edell, Welter & Schmidt

[57] ABSTRACT

A clean room ceiling grid system having a detent means for loading filter panels into ceiling grids from a clean room. The system is operable to permit removal of the filter panels by use of a filter panel removing tool. More particularly, this clean room ceiling grid system requires no plenum space use above the grid members for either installation or removal of filter panels. The system also includes means for hermetically sealing the interface of connected ceiling grid members and means for substantially laminar flow of filtered air in clean rooms.

2 Claims, 7 Drawing Sheets

END SEAL FOR CLEAN ROOM CEILING SUPPORTS

FIELD OF THE INVENTION

The present invention relates generally to filter ceiling systems for clean rooms. More particularly, this invention concerns a ceiling grid filter system of improved construction which permits installation and removal of filter panels from beneath the grid without requiring additional clearance above the grid, while maintaining better sealing and air flow characteristics.

BACKGROUND OF THE INVENTION

Clean room environments with ceiling grid systems containing high efficiency filters are utilized in many industries. For example, such systems are used when manufacturing components of high tolerance to control airborne contaminants, etc. Typical systems generally employ drop ceilings, above which is a plenum, from which air passes through filter panels in the ceiling grid and into the clean room. Return air plenums can be provided in the floor or sidewalls of the room.

Numerous different grid arrangements have been employed to hold the filter panels. Such filter panels are typically replaceable. Various methods of sealing these filter panels with respect to the supporting framework of grid systems have been used, ranging from soft neoprene mats to the newer non-hardening gel seals.

In many of these prior systems, disadvantages exist. For example, most ceiling grid systems require unobstructed space above the grid in order for a filter panel to be lifted into the grid frame and then lowered into or onto the grid. Typically, these filters are awkward to handle and difficult to install. Further, the risk of mishandling or damaging these filter panels is greatly increased by overhead piping or other obstructions which are often located in the plenum region above the ceiling grid. Moreover, systems which require lifting a filter panel above the grid frame generally require the individuals installing them to be positioned on ladders or steps raised above the clean room floor. Such access requirements increase the risk of injury, as well as the cost and time of properly maintaining these systems.

Frequently, filter panel removal from a ceiling grid requires disassembly of retaining bars or other holding mechanisms. This in itself creates various problems. Disassembly tools or disassembled parts may be easily dropped onto people or equipment beneath. Similarly, these mechanisms may become loose, disassemble and fall due to plenum vibration or oscillation. Also, filter systems having numerous parts may require even greater installation expense, as well as replacement part difficulties.

Other disadvantages of present day clean room ceiling grid filter systems include: gel seals in the grid frame being very messy to handle and install; gaskets on the filters laying on the grid not sealing well; filters being larger than the respective grid openings, making installation and removal difficult; and extra support systems being necessary to hold the ceiling grid because it cannot typically span building joist systems. Easily modified ceiling grids do not usually seal well, whereas, prefabricated grids which seal well cannot be easily modified in the field. Adaptability to small work spaces and low ceiling heights is often impracticle. Many systems provide only one hermetic sealing means.

What has been needed has been an improved, more compact, efficient and effective ceiling grid filter system: providing an easily installed and readily adaptable supporting grid system; providing means for installing filter panels from beneath by pushing the filter panel straight up into the grid from the clean room, so no extra clearance for the filter panels is needed above the grid and associated damage to the filter panel is virtually eliminated; providing means for easily removing and replacing filter panels utilizing a single tool; providing a ceiling grid system which eliminates the messy job of placing gel in the grid; providing a ceiling grid system which incorporates a knife edge and gel seal relationship, thereby permitting a double seal; providing for improved control of filtered air flow thereby eliminating or reducing the size of vortices below grid members and encouraging substantially laminar flow patterns. Also, a ceiling grid filter system which is relatively inexpensive to produce and is easily assembled is preferred.

Objects and advantages of the present invention in achieving these and other goals will become apparent from the following descriptions, taken in connection with the accompanying drawings, wherein are set forth by way of illustration and example certain embodiments of the present invention.

SUMMARY OF THE INVENTION

A system is provided to facilitate the installation and operation of clean room ceiling grid filter systems. More specifically, the system is operable to assist in relatively safe, efficient and effective filtration of supply air into a clean room environment. In particular, the system is selectively operable to provide a substantially laminar flow clean room environment. The system is particularly well suited for high cleanliness areas due to the combination of various features, providing overall reduction in non-laminar flow of air, as well as a reduction of vortex generating surfaces. That is, a reduction in non-laminar flow permits greater cleanliness and more predictable flow patterns of air within a clean room constructed according to the present invention.

Systems according to the present invention include: grid member means in which at least one filter panel may be inserted from beneath the grid members; filter panel mounting means on grid members for supporting vertically inserted filter panels; and, means for actuating the filter panel mounting means to permit selective removal of filter panels. Preferably, the filter panel mounting means is constructed and arranged for readily inserting a filter panel into a pattern of ceiling grid members and for providing reliable support for the fully inserted filter panel. It will be understood from the detailed descriptions herein that the filter panel mounting means of the present invention is particularly well adapted for these and other purposes.

A ceiling grid system according to this invention could also include: various means for mounting a plurality of grid members in a clean room; means for readily connecting and disconnecting a plurality of grid members to form variable grid patterns; means for hermetically sealing the interface of a plurality of connected grid members; and, various fairing means for providing smoother, more predictable flow patterns of air in the clean room.

Preferably, filter panels according to the present invention include: high efficiency filtering material; a first end into which supply air is provided; a second end from which filtered air is emitted to the clean room; upper and lower circumferential flanges defining upper and lower filter apertures; and, surrounding side walls.

A filter panel mounting means of a grid member according to the present invention preferably comprises an elongate depending lower section of the grid member. This lower section may have a detent or spring clip mounting means attached thereto, or integral therewith, and selectively positionable between a first compressed position and a second, normally extended position. The first position permits a filter panel to be inserted into the ceiling grid member from beneath the grid member in the clean room. The second position, permits the filter panel upper circumferential flange to operably rest thereon when the filter panel is fully inserted in the grid member.

For preferred embodiments, the spring clip mounting means includes a selectively compressible filter engaging section having top and bottom ends. The filter engaging section bottom end is generally attached to the filter mounting lower section of the grid member, and the engaging section top end is bent away from the filter mounting lower section. Therefore, during insertion of the filter panel from beneath the ceiling grid in the clean room, the spring clip filter engaging section top end is moved to the first compressed position by contact with the filter panel upper circumferential flange. However, when the filter panel upper circumferential flange is positioned above the top end of the spring clip filter engaging section, it moves back to the second extended position and thus retains the filter panel in the ceiling grid member.

A relatively simple means for attaching a spring clip to the grid member filter mounting lower section comprises: a filter mounting lower section having notched first and second sides; a spring clip having an anchoring section including one or more generally horizontally oriented protrusions constructed and arranged for mating engagement in oppositely disposed notches in the filter mounting lower section; and, means for conformally attaching the spring clip anchoring section to the grid member filter mounting lower section. An advantage of this attaching means is that the weight of the filter is supported by the spring clip top end, as well as by the notched portion of the grid member filter mounting lower section. It is desirable, although not required in order to practice the present invention, that the top end of the spring clip is comprised of an outer surface formed of a material which is different than the material forming the filter panel upper circumferential flange, such as plastic.

The preferred clean room ceiling grid system according to the present invention includes a filter panel upper circumferential flange which is generally U-shaped in the cross-section, defining a sealant trough therebetween. The sealant trough may include means for hermetically sealing the filter in cooperation with a grid member sealing portion depending from the grid member structural upper section. Sealing means placed in the sealant trough includes the preferred non-hardening gel seals of various compounds, non-porous gaskets, or combinations of both. The filter panel lower circumferential flange preferably comprises means for: supporting a filter cap thereon; providing substantially laminar flow within a clean room; and, for hermetically sealing a lower chamber circumferentially surrounding the filter panel side walls.

It has been found that present day ceiling grid filter systems do not adequately prevent or control formation of vortices in the flow throughout the clean room environment. Specifically, undesirable air flow patterns are induced by non-faired ceiling grid members causing vortex regions beneath the ceiling grid members, beneath light fixtures in ceiling grid members, along walls, and at other locations. Such vortices form conduits through which particles may be moved throughout the grid system. To prevent such vortices and undesirable flow patterns from occurring, the flow characteristics of air emitting from the filter panels into the clean room may be incorporated into the design of the ceiling grid system. A preferred method of solving these problems is the provision of filter caps which are placed beneath the ceiling grid members and other vortex generating locations identified above. These filter caps include means for substantially attaching part of the air flow exiting the filter panels to the filter cap sidewalls, thereby substantially preventing separated wakes and vortices. Preferably, the filter cap is generally in the shape of an inverted A in the cross-section and comprises: side walls having lower and upper ends; means for attaching the filter caps to the filter panel lower circumferential flange; and a generally horizontally extending cross member for supporting a sealant material within the filter cap. An optimum angle of the side walls with respect to the vertical is generally between about 4 degrees and about 12 degrees, although 0 degrees to about 12 degrees is acceptable. Sidewall slope angles which are substantially beyond these limits do not provide adequate diffusion and attaching characteristics and therefore do not adequately prevent vortices from forming beneath the grid member areas. For preferred filter caps, an apex portion is formed by the intersection of the sidewall lower ends. This apex portion, in cooperation with the optimum angles noted above, provides significant improvement in the shaping of air flow from the filter panel into a substantially laminar pattern.

Another preferred filter cap construction is particularly well suited for use beneath light fixtures or other grid system structures. A filter cap is provided which is generally in the shape of a V or a U in the cross-section having sidewalls with stepped sections therein. Each of these stepped sections includes a width defining surface oriented approximately perpendicularly to the axis of the air flow emitting from the adjacent filter panel, and a height defining surface oriented generally parallel to the axis of the air flow emitting from the adjacent filter panel. A width to height aspect ratio of between about 1:1.5 and about 1:7 permits the stepped sidewalls to minimize and control any vortices generated while facilitating shorter but effective filter caps. Stepped sidewall filter caps permit greater pull-in angles of the sidewalls than in non-stepped filter caps while maintaining any bound vortices in predictable locations between the sidewall upper and lower ends. It is further desireable to form and control bound vortices on the sides rather than at the lower end of a filter cap in that the intersecting lattice of the grid system then limits the propagation of particles within a vortex conduit to a small area of the clean room. Forming steps with bound vortices in desired locations achieves this objective.

The filter caps according to the present invention provide several advantages. These filter caps controls formation of vortices in the air emitting from the adjacent filter panels; substantially eliminates formation of vortices at the lower end of the filter cap; provide barrier-type deflecting means for redirecting bound vortices along a clean room ceiling grid structure; provide means for sealing the region between adjacent filter panel sidewalls or filter panel sidewalls and clean room walls.

A preferred filter panel lower circumferential flange comprises means for attaching the filter cap thereon as well as means for providing hermetic sealing. Accordingly, a preferred filter panel lower circumferential flange includes: an angled lower edge member having an upper receiving surface constructed and arranged for conformally mating a filter cap upper end, and a lower sealing surface constructed and arranged for insertion in a sealant material preferably located on the filter cap cross member. Other embodiments may provide for two or more separate members performing the above-described functions of a preferred embodiment.

Another advantage of the clean room ceiling grid filter system according to the present invention is the relative ease of inserting, removing, and replacing filters in relation to the grid members. This advantage is substantially achieved by the spring clip construction described above in cooperation with a vertically oriented ramped protrusion positioned on the filter panel sidewalls facing the spring clip, and a filter panel removing tool. Preferably, the filter panel removing tool is comprised of a handle portion; a horizontally oriented filter panel supporting portion attached to the handle portion, and a spring clip releasing portion attached to the filter panel supporting portion. In a preferred filter panel removing tool, the spring clip releasing portion has a plurality of vertically oriented plates constructed and arranged for insertion between the filter panel sidewalls and the spring clips or detent means. These vertical plates engage the ramped protrusions and the spring clips so that the spring clip top end is moved from supporting engagement with the filter panel upper circumferential flange as the spring clip releasing portion of the filter panel removing tool is moved vertically. A preferred filter panel removing tool permits the filter panel supporting portion to be in contact with the filter panel lower circumferential flange at approximately the same time that the circumferentially mounted spring clips are moved from supporting engagement with the filter panel upper circumferential flange; so that the filter may be readily and safely released downwardly by gravity onto the filter panel supporting portion of the removing tool. A filter panel removing tool may include variable length filter panel supporting portions so as to permit operation with different size filter panels.

A preferred grid member according to the present invention includes a structural upper section having two vertically oriented sidewall members, with each sidewall member having a top end angled generally perpendicularly toward the other sidewall member. These two angled top ends define a space, such as a T-slot, which permits placement of ceiling attaching means between the grid member and the clean room ceiling. Each of the sidewall members also includes a bottom end which comprises the above-mentioned grid member sealing portion. A preferred grid member structural upper section also includes an upper and a lower horizontal cross member positioned between the sidewall members to form a grid member upper chamber having a generally rectangular cross section. The construction of the structural upper section of a preferred grid member provides for ready connection and disconnection of a number of grid members to form variable grid patterns. This is preferably achieved by a connecting member which is constructed and arranged for slideable placement in a plurality of adjacent grid member upper chambers. This connecting member provides both structural support as well as alignment for the adjacent grid members. Additionally, a tab piece is constructed and arranged according to the present invention for conformal attachment to grid member sealing portion at the joint of adjacent grid members. This tab piece is readily attachable to the grid member sealing portion and provides sealing means for the adjacent grid member sealing portions. This tab piece also permits simple repair of grid member sealing portions which have been removed or mis-cut.

In order to prevent the leakage or penetration of non-filtered supply air through grid member connections into the clean room, means is provided for hermetically sealing the interface of a plurality of grid members. A preferred means includes: placing a plurality of protrusions on a first end surface of the grid members intended for abutting relationship with other grid members so that caulking material may leak past the protrusions and seal the connection; placing an aperture in a sidewall of the grid member which permits infusion of a predetermined amount of caulking compound into the grid member upper chamber near the interface with another grid member; placing a caulking plate or cup within the grid member upper chamber so as to form a stop means to prevent backfilling of the grid member upper chamber with caulking compound. This sealing means allows for rapid installation of desired ceiling grid patterns as well as providing indicating means around the butt joint of the grid members when the caulking compound leaks out the connection. Moreover, to facilitate the flexibility of this clean room ceiling grid system, an axially oriented groove is located along the length of the grid member sealing portion. This axial groove permits accurate and efficient cutting of grid member joint sections.

Yet another advantage of a ceiling grid filter system according to the present invention is a means for providing a negative pressure plenum in the grid member upper and lower chambers. This negative pressure plenum provides further means for removing non-filtered air from within the grid member upper and lower chambers.

The drawings constitute a part of this specification and include exemplary embodiments with the present invention, while illustrating various objects and features thereof. It will be understood that in some instances relative material thicknesses and relative components sizes may be shown exaggerated, to facilitate an understanding of the invention.

DETAILED DESCRIPTION OF THE INVENTION

As required, detailed embodiments of the present invention are disclosed herein. It is to be understood however, that the disclosed embodiments are merely exemplary of the invention, which may be embodied in various forms. Therefore, specific structural and functional details disclosed herein are not to be interpreted as limiting, but rather as a basis for the claims and as a representative basis for teaching one skilled in the art to variously employ the present invention in virtually any appropriately detailed system or structure.

Although a ceiling grid system of the present invention preferably depicts air flow in a downwardly direction, it should be understood that this invention may also be adapted for use in clean room sidewalls from which air flow may be generally horizontally oriented into a clean room.

Figure 1:
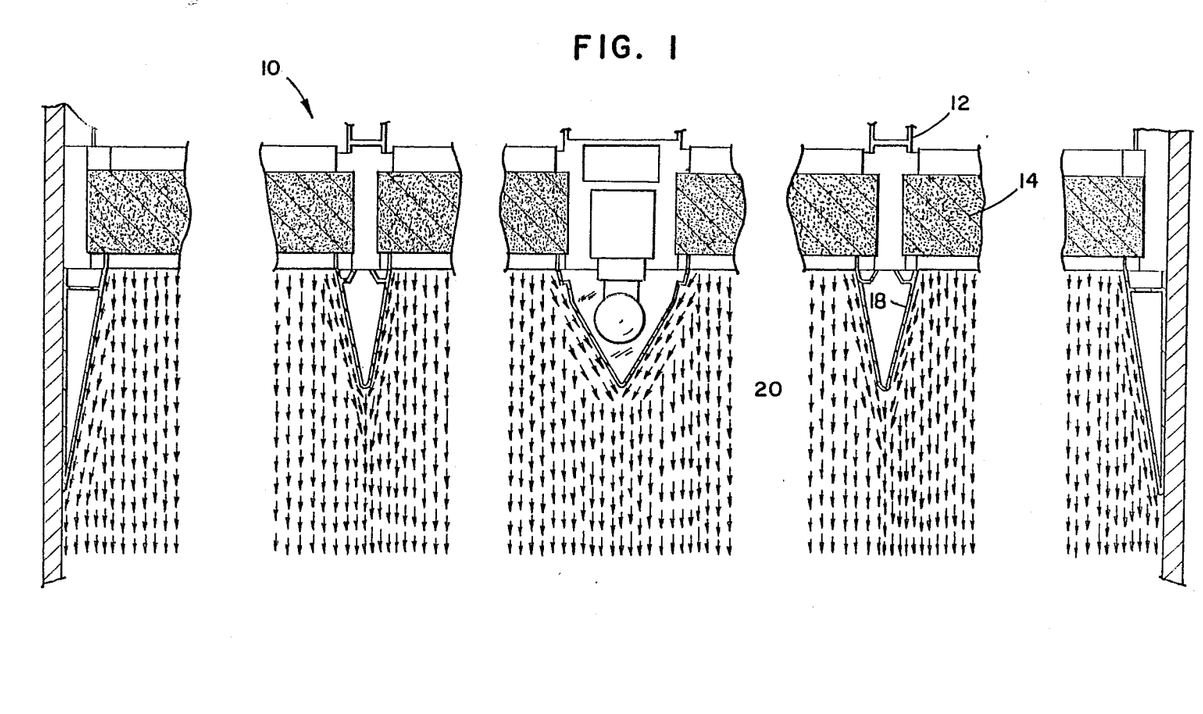
FIG. 1 is a side cross-sectional environmental illustration of a clean room ceiling grid filter system according to the present invention illustrating substantially laminar flow of air in the clean room.

Referring to FIG. 1, the reference numeral 10 generally designates a ceiling grid system according to the present invention. In FIG. 1, the ceiling grid system 10 is shown in a cross-sectional representation of a typical environment for use. Specifically, ceiling grid system 10 according to the present invention is illustrated including: a plurality of panel supporting grid members 12; a plurality of filter panels 14 mounted in grid members 12; filter caps 18 positioned beneath grid members 12; clean room 20. It will be understood that ceiling grid system 10 may be utilized in a variety of environments and patterns.

FIG. 1, ceiling grid system 10 is shown with arrows indicating the substantially laminar flow air patterns in clean room 20 due to the placement and shape of filter caps 18 positioned beneath selected filter panels 14 from which filtered air is entering clean room 20. As will be discussed in greater detail in this specification, ceiling grid system 20 includes various means for providing substantially laminar, vortex-free, flow of air within clean room 20.

Figure 2A:
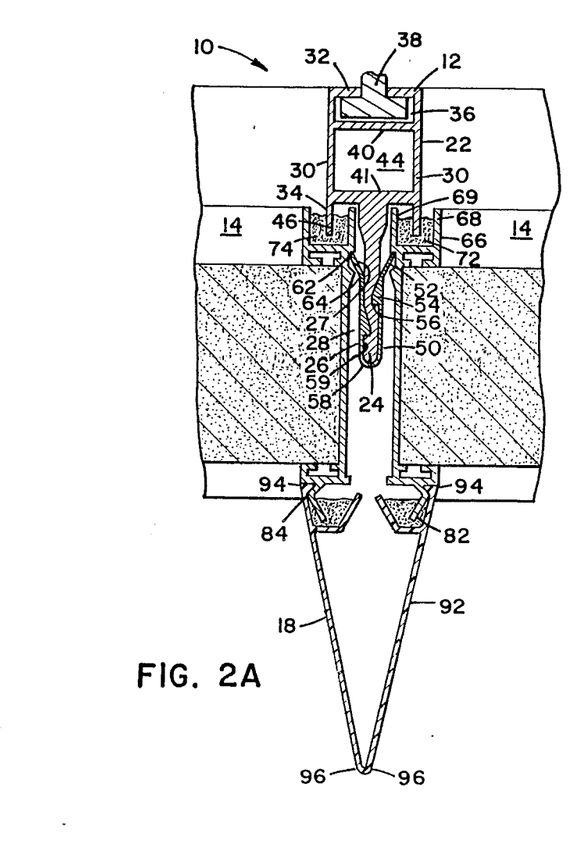
FIG. 2A is a side cross-sectional view showing a preferred grid member with a spring clip attached thereon; two filter panels are mounted on the grid member and a preferred filter cap is removably mounted on the filter panel lower circumferential flanges.

FIG. 2A is a side cross-sectional view showing a preferred grid member 12 of ceiling grid system 10. Grid member 12 is constructed so that filter panels 14 may be readily inserted into grid member 12 from clean room 20. Grid member 12 includes means for pushing filter panel 14 vertically into supporting engagement in grid member 12 without need for extra space to maneuver filter panel 14 above grid member 12. This advantage permits installation of ceiling grid system 10 in spaces which may not have suitable overhead clearance for other ceiling grid systems.

FIG. 2A illustrates a preferred grid member 12 having a structural upper section 22 and a filter mounting lower section 24. Filter mounting lower section 24 further includes mounting means 26 preferably in the form of detent mounting means 27 which may be shaped, as illustrated in FIG. 2A, in the form of a spring clip 28. When one or more filter panels 14 are mounted in grid member 12, filter cap 18 may be attached to a bottom portion of the filter panels. Filter cap 18 encourages proper diffusion of filtered air emitting from filter panels 14 into clean room 20 so that a non-turbulent, generally laminar flow of air is allowed. Filter cap 18 also functions as a barrier which deflects any other air currents which may be present in clean room 20 and encourages those air currents into a generally laminar flow pattern.

The structural upper section 22, for the preferred embodiment of grid member 12, comprises two vertically oriented opposing side wall members 30, each having a top end 32 and a bottom end 34. As illustrated in FIG. 2A, top end 32 of each side wall member 30 is angled generally perpendicularly toward the opposing side wall member 30. The two opposing angled top ends 32 define a space 36 therebetween which permits placement of grid member ceiling attaching means 38 in space 36. Structural upper section 22 also includes an upper horizontal cross member 40 and a lower horizontal cross member 41; each of the cross members 40, 41 extending between side wall members 30. Cross members 40, 41 and side wall members 30 cooperate to form a grid member upper chamber 44 having a generally rectangular cross section. Each side wall bottom end 34 comprises a grid member ceiling portion 46 which extends downwardly below lower horizontal cross member 41 of structural upper section 22 and provides a knife-edge sealing means in cooperation with filter panels 14 when filter panels 14 are fully mounted on grid member detent means 27.

Grid member 12 filter mounting lower section 24 is constructed, in a preferred embodiment, of an elongate vertically oriented member positioned within a lower chamber 45 defined by filter panels 14, grid member lower horizontal cross member 41, and filter cap 18. Detent mounting means 27 is attached to filter mounting lower section 24 and is movable between a first compressed position which permits filter panel 14 to be inserted into grid member 12 from clean room 20, and a second extended position at which detent mounting means 27 supports filter panel 14 in a normal operating position. The construction of detent mounting means 27 permits filter panel 14 installation into grid member 14 from below a plane including substantially all of grid member 14 structural upper section 22.

In a preferred embodiment, detent mounting means 27 is a spring clip 28 comprising an anchoring section 50 and a filter engaging section 52. Spring clip anchoring section 50 may be generally U-shaped in the cross section and has means for anchoring spring clip 28 onto filter mounting lower section 24 of grid member 12. Means for anchoring spring clip anchoring section 50 onto filter mounting lower section 24 includes at least one generally horizontally oriented protrusion 54 which is positioned for mating engagement in an oppositely disposed notch in grid member filter mounting lower section 24. The engagement of protrusion 54 within notch 56 provides support for the weight of filter panel 14 which is mounted on spring clip filter engaging section 52. A preferred spring clip 28 includes a bottom edge portion 58 which is conformally attached to the lower edge 59 of filter mounting lower section 24. As constructed, this preferred spring clip 28 may be firmly secured to filter mounting lower section 24 without need for further attaching means.

Spring clip filter engaging section 52 includes a top end 62 and a bottom end 64. This preferred spring clip filter engaging section 52 is selectively compressible, with bottom end 64 being attached to anchoring section 50 and top end 62 being bent away from the vertically oriented grid member filter mounting lower section 24. In operation, top end 62 engages filter panel 14 when filter panel 14 is fully inserted vertically into grid member 12. Also, spring clip filter engaging section top end 62 may include an outer surface formed of a material which is different than the material forming filter panel upper circumferential flange 66. Preferably top end 62 comprises a hardened plastic surface. Further discussion will detail means permitting compression of spring clip filter engaging section top end 62 and removal of filter panel 14 from grid member 12.

Filter panel 14 includes an upper circumferential flange 66 having means for engaging detent mounting means 27 or spring clip filter engaging section 52 during installation of filter panel 14 into grid member 12. Preferably, filter panel upper circumferential flange 66 permits filter panel 14 to operably rest on spring clip filter engaging section top end 62. This may be most readily accomplished by means of a filter panel upper circumferential flange 66 which extends laterally from filter panel 14 so as to allow engagement with spring clip 28. Moreover, filter panel upper circumferential flange 66 may also provide an upper sealing means for hermetically sealing filter panel 14 within grid member 12. Flange 66 is generally U-shaped in the cross-section with a first wall 68 and a second wall 69 defining a sealant trough 72 therebetween. Sealant trough 72 provides means for hermetically sealing filter panel 14 in cooperation with grid member ceiling portion 46. A preferred means of achieving the advantages of sealing trough 72 includes placement of a predetermined thickness of sealant material 74 therein. Preferably, sealant material 74 is a gel-type sealant, although a gasket or a gasket-gel combination may be used in, which readily receives grid member ceiling portion 46 to form the above referred to hermetic seal between upper circumferential flange first wall 68 and second wall 69.

Filter panel 14 preferably includes a lower circumferential flange 80 as shown in FIG. 2A. Lower circumferential flange 80 includes a substantially vertically oriented lower edge member 82 which protrudes downwardly from lower circumferential flange 80. In cooperation with filter cap 18, lower edge member 82 comprises a filter panel lower sealing means. Further, an angled surface 84 protrudes downwardly from lower circumferential flange 80 and is constructed and arranged for conformal mating with filter cap 18. As illustrated in FIG. 2A, a preferred lower circumferential flange 80 includes a lower edge member 82 and an angled surface 84 comprising one member.

Figure 2B:
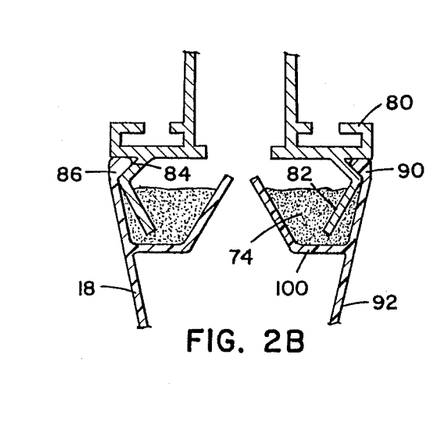
FIG. 2B is a side cross-sectional detail view of a preferred filter panel lower circumferential flange and filter cap attaching and sealing means, generally analogous to FIG. 2A, illustrating a generally vertically oriented sealing member having an angled attaching surface for removable mounting of the filter cap.
Figure 2C:
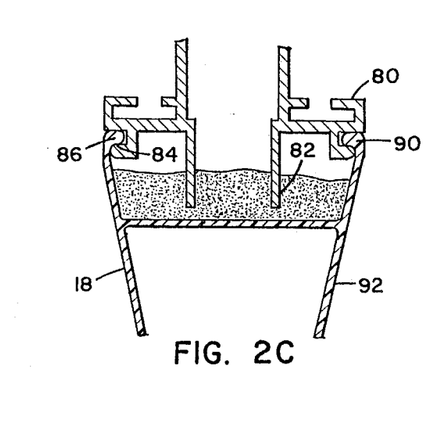
FIG. 2C is a side cross-sectional detail view of an alternate configuration for a filter panel lower circumferential flange and means for removably mounting a filter cap thereon.
Figure 2D:
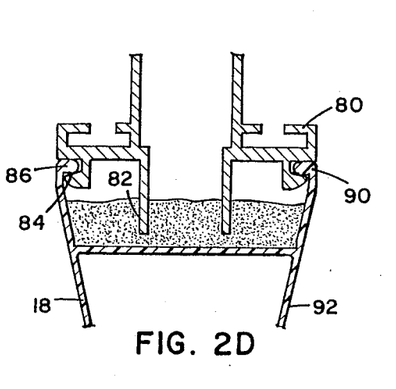
FIG. 2D is a side cross-sectional detail view of an alternate configuration for a filter panel lower circumferential flange and means for removably mounting a filter cap thereon.
Figure 2E:
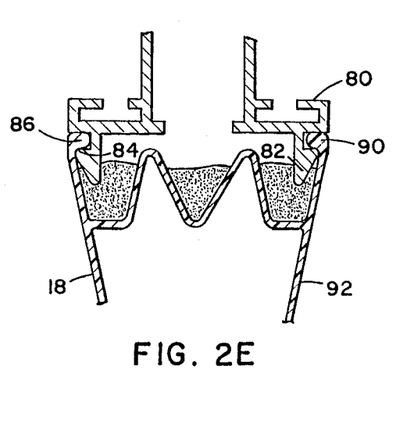
FIG. 2E is a side cross-sectional detail view of an alternate configuration for a filter panel lower circumferential flange and means for removably mounting a filter cap thereon.

FIGS. 2B-FIGS. 2E illustrate various filter panel lower sealing means and attaching means involving filter cap 18 and lower circumferential flange 80. FIG. 2B illustrates, in greater detail than FIG. 2A, the construction of a preferred embodiment. More particularly, FIGS. 2B-2E illustrate the mating relationship between filter cap 18, attaching means 86 and lower circumferential flange 80 angled surface 84. In each of the above embodiments, the outer surface 90 of filter cap attaching means 86 is initially substantially co-planar, or substantially within at 12° angle, with the vertical plane of lower circumferential flange 80 of filter panel 14. This relationship substantially reduces or eliminates formulation of bound vortices and unobstructed flow of air from filter panel 14 into clean room 20 along filter cap 18.

Ceiling grid system 10 is designed to substantially maintain aerodynamic attachment of a clean room 20 air flow from filter panels 14 along at least one sidewall 92 of filter cap 18. This attachment substantially eliminates or reduces air flow eddies and vortices otherwise created generally beneath grid member segments in other ceiling grid systems. This reduction in vortex effect is accomplished by filter cap 18 being generally in the shape of a V in the cross-section or in the shape of an inverted A in the cross-section. As shown in FIG. 2A, side walls 92 are provided having upper ends 94 and lower ends 96. Filter cap side wall upper ends 94 include angled portions comprising filter cap attaching means 86. Side walls 92 of filter cap 18 are sloped away from the vertical plane to permit controlled diffusion of filtered air entering the clean room resulting in a substantially laminar, vortex free, flow of that air along and beneath filter cap 18. Optimally, the angle of the slope of the side walls 92 in a direction away from the vertical is between about 4° and about 12°. Generally, slopes greater than or less than these angles result in unacceptable air flow patterns creating and maintaining undesirable bound vortices. Although a tapered filter cap 18 is preferred, a carefully truncated filter cap may achieve significant advantages according to this invention, providing that means are provided to capture or obstruct any vortices created when those vortices migrate from the region near truncated filter cap 18.

Figure 5:
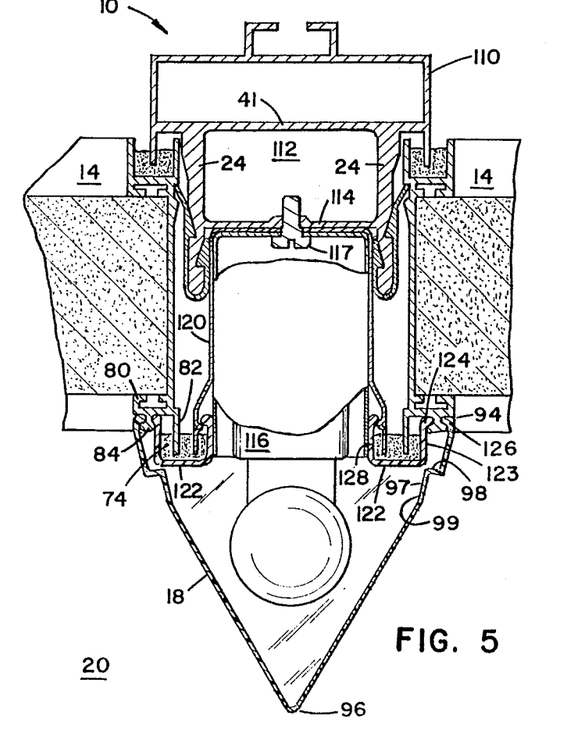
FIG. 5 is a side cross-sectional view of an alternate ceiling grid member including a plurality of filter mounting lower sections accommodating a light fixture, with filter panels mounted on either side, and a stepped sidewall filter cap and sealing caps mounted beneath the light fixture.

Another means for substantially maintaining aerodynamic attachment of clean room 20 air flow from filter panels 14 along filter cap 18 includes V-shaped in the cross-section filter caps 18 which have at least one stepped section 97, shown in FIG. 5, in sidewalls 92. In general, greater slope angles require a plurality of stepped sections 97. Stepped section 97 permits filter cap 18 to have sidewalls 92 with slope angles greater than in a non-stepped filter cap. This feature is particularly advantageous to overcome the problems created by wide gaps between filter panels 14 such as when lighting fixtures or other obstructions are mounted in ceiling grid systems 10. Normally, such wider gaps between filter panels 14 require filter caps having sidewall slopes which permit vortices to form beneath the filter cap. Alternatively, such filter caps must extend unacceptably far down into a clean room. Accordingly, an air flow attaching means of filter cap 18 according to the present invention, as illustrated in FIG. 5, includes stepped sections 97 each having a width defining surface 98 and a height defining surface 99. Preferably, width defining surface 98 is oriented generally perpendicularly to the axis of local air flow from filter panels 14 near step 97 and height defining surface 99 is oriented generally parallel to the axis of local air flow from filter panels 14 near step 97. An aspect ratio of the size of width defining surface 98 to the size of height defining surface 99 comprises means for maintaining attachment of the air flow to filter cap 18 sidewalls 92 and for minimizing the size of any vortex which is generated along sidewall 92. The use of stepped sections 97 in sidewalls 92 provides means for maintaining any vortex which is generated between sidewall upper end 94 and lower end 96. Thus, a vortex, labelled V in FIG. 5, which may be generated by air exiting filter panel 14 or by cross-currents in clean room 20 is substantially trapped by filter cap 18. Filter caps 18 may be varied in length, and the number of steps 97, and thereby provide means for shaping undesired air flow in clean room 20 into desired flow patterns. A preferred aspect ratio of stepped sections 97 is between about 1:1.5 and about 1:7.

Filter cap 18, shown in FIG. 2B, when also functioning as a filter panel lower sealing means, includes at least one generally horizontally extending upper cross member 100 for supporting sealant material thereon. A sealant material similar to that earlier mentioned for use in a filter panel upper circumferential sealant trough 72 is preferred. Such sealant material located on upper horizontal cross member 100 permits extension of lower edge member 82 into the sealant material 74 to form a filter panel lower hermetic seal. Accordingly, ceiling grid system 10 may include a double hermetic seal or a single hermetic seal located either near the top or the bottom of filter panel 14.

Figure 3:
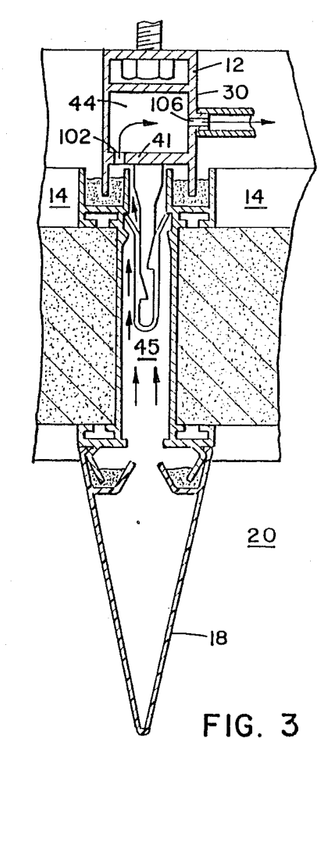
FIG. 3 is a side cross-sectional view, generally analogous to FIG. 2A, illustrating a preferred ceiling grid member having means for providing a negative pressure plenum within the grid member lower and upper chambers.

FIG. 3 illustrates further means for achieving a hermetic seal between filter panel 14, grid member 12, and filter cap 18. In FIG. 3, grid member 12 lower horizontal cross member 41 includes an aperture 102 between grid member upper chamber 44 and grid member lower chamber 45. Aperture 102 permits air flow between upper chamber 44 and lower chamber 45. Additionally, aperture 106 is provided, preferably, in a side wall member 30 of grid member 12 which is selectively operable and provides means for creating a negative pressure plenum in upper chamber 44 and lower chamber 45. A grid member 12 in this configuration further enhances the capability of ceiling grid system 10 to prevent improperly filtered air from entering clean room 20. Further means for sealing connected grid members, and thereby preventing additional sources of non-filtered and uncontrolled vortex containing air, from entering clean room 20 will be explained in detail later in this specification.

Figure 4:
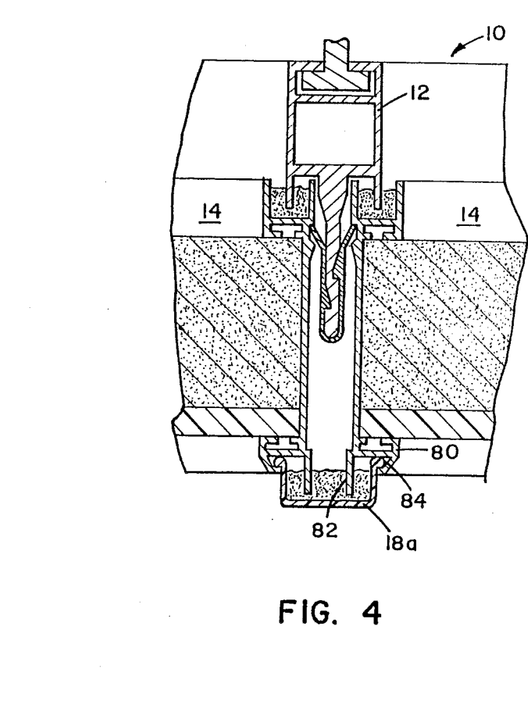
FIG. 4 is a side cross-sectional view illustrating a preferred ceiling grid system having an alternate embodiment filter cap sealing and attaching means.

FIG. 4 illustrates preferred grid member 12 having filter panels 14 fully mounted therein. However, filter panels 14 include an alternate lower circumferential flange 80 having means for supporting an inside mounting truncated filter cap 18a. In this embodiment, lower circumferential flange 80 includes vertical lower edge member 82 as well as angled surface 84. In this configuration, angled surface 84 and truncated filter cap 18a form a bound vortex on the side of the filter cap 18a.

Figure 6:
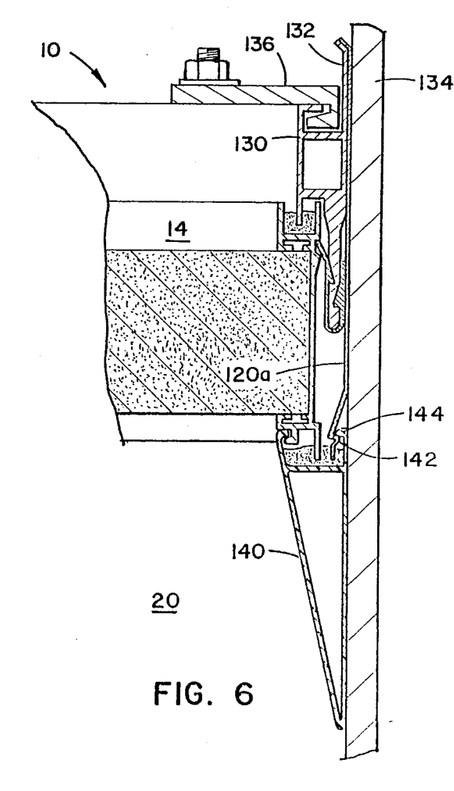
FIG. 6 is a side cross-sectional view of a preferred grid member constructed for operation proximate a sidewall or other barrier.

Ceiling grid system 10 includes alternate grid member configurations for use with lighting fixtures, as illustrated in FIG. 5, and side walls or other barriers as illustrated in FIG. 6. FIG. 5 shows an alternate grid member 110 having two filter supporting lower sections 24. As illustrated in FIG. 5, grid member 110 is constructed similar to grid member 12. However, grid member 110 includes an additional chamber 112 positioned between filter mounting lower sections 24 and beneath lower horizontal cross member 41. Chamber 112 includes cross piece 114 comprising means for attaching light fixture 116. Such attaching means may include conventional attaching means such as a bolt 117 or other similar means. Cross piece 114 also facilitates placement of any cabling for light fixture 116. A holding lip 120 may be attached to cross piece 114 and conformally fit around a portion of light fixture 116 to provide supporting engagement for sealing caps 122 having side walls 123 and sealant material 74 therein. As illustrated in FIG. 5, filter panel lower circumferential flange 80 includes vertically oriented lower edge sealing member 82 and angled surface 84. Angled surface 84, in this embodiment, comprises an inverted T-bar shaped member designed to receive a sealing cap attaching means 124 and a light fixture filter cap attaching means 126. A second side wall 128 of sealing cap 122 is held in place by holding lip 120, which also functions as a means of double sealing the interface of light fixture 116 and filter panel 14. Light fixture filter cap 18 may be larger than other filter caps 18 to include ceiling caps 122 therein, and may also be constructed of an opaque, transparent, or other suitable material to permit lighting of clean room 20. Alternate grid member 110 retains the advantages of grid member 12 while accommodating light fixtures and other obstructions or separations in ceiling grid system 10.

FIG. 6 is a side cross-sectional view of a preferred grid member modified for operation proximate a side wall or other barrier. In this illustration, grid member 130 includes a side wall member 132 constructed for attachment to a clean room wall 134 and/or ceiling member 136. A holding lip 120a may be mounted between grid member 130 and clean room wall 134; holding lip 120a facilitating attachment of tapered filter cap 140, having at least one sidewall 141 conformally attached or abutting a clean room wall 134 or other barrier, by means of an angled surface 142 designed for mating engagement of tapered filter cap attaching means 144. Many clean rooms 20 include walls 134 which may permit use of tapered filter caps 140 having minimal slope angles and greater lengths in order to encourage substantially laminar vortex-free flow along the wall regions of such clean rooms. Grid member 130 and tapered filter cap 140 cooperate with filter panel 14 to hermetically seal filter panel 14 and to provide substantially laminar vortex-free flow within clean room 20. Slope angles of between about 4° and 12° are also preferred for tapered filter cap 140.

Figure 7:
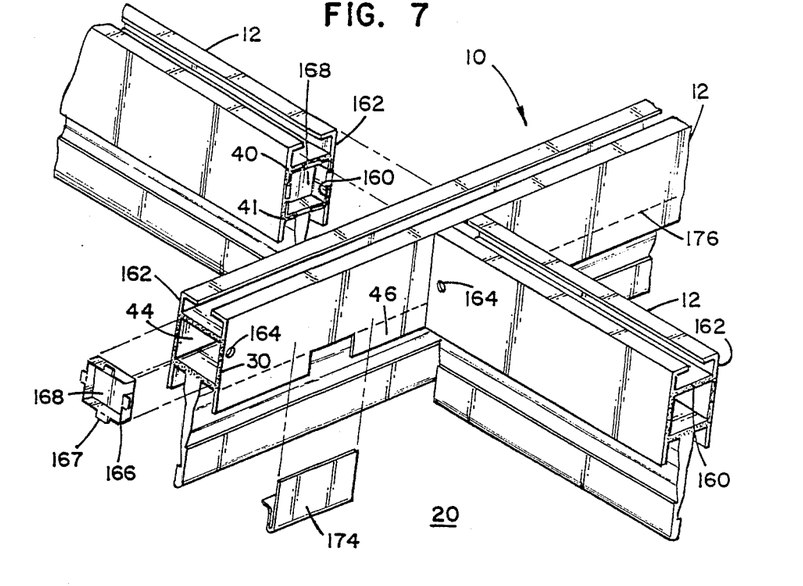
FIG. 7 illustrates a partially completed connection of a plurality of grid members; the grid members having capping means for caulking and hermetically sealing the connection of the grid members; and further illustrating an axially oriented groove along the length of a grid member to facilitate accurate cutting of the grid member; and a tab piece shown removed from a grid member sealing portion having an aperture therein.

FIG. 7 illustrates a partially completed connection of a plurality of grid members according to the present invention. Grid members 12 illustrate further means for hermetically sealing the interface of a plurality of grid members in a ceiling grid system, including a ceiling grid system 10 of the present invention. This hermetic sealing means includes a plurality of small protrusions 160 located on, and protruding from, a first-end 162 of grid members 12 where grid members 12 are designed to abut with other grid members 12. Protrusions 160 cause irregular mating surfaces on first ends 162 thereby permitting caulking compound, or similar material, to effectively seal the interface of grid members 12. To facilitate the infusion of caulking compound or similar material into grid members 12 near ends 162, an aperture 164 is provided which extends, preferably, through a side wall member 30 of grid member 12. Preferably, aperture 164 enters grid member 12 proximate end 162 and within grid member upper chamber 44. A caulking stop means 166, including a caulking cup having lip retaining means 167 for holding said grid member 12 first end 162, is located within grid member 12 upper chamber 44, also proximate end 162, to prevent backfilling of upper chamber 44 with caulking material. Caulking stop means 166 cooperates with grid member side wall members 30 and grid member horizontal cross members 40, 41 to form a caulking cavity 168. Aperture 164 permits a predetermined amount of caulking compound to be infused into caulking cavity 168 and to leak around protrusions 160 and/or into retaining lips 167 to provide hermetic sealing of the interface of connected grid members 12. This sealing means further prevents non-filtered air flow within the regions of grid members 12, thereby enhancing the cleanliness of clean room 20. A further advantage of the sealing means above described includes the relative ease of forming this seal.

A tab piece 174 is provided in ceiling grid system 10 for conformal attachment to grid member sealing portions 46 of connected grid members 12. Tab piece 174 provides further sealing means at the connecting joint of grid member sealing portions 46. Tab piece 174 may also be utilized to repair or seal cuts made in grid member sealing portion 46 due to prior ceiling grid system configuration, or unintentional miscuts during assembly. Tab piece 174, as illustrated in FIG. 7, is shaped for vertically pressing onto grid member sealing portion 46 in a conformal mating relationship. Therefore, tab piece 174 further contributes to the versatility of a ceiling grid system 10 of the present invention. Additional versatility may be achieved in connecting and disconnecting a plurality of grid members 12 according to the present invention, by utilizing an elongate connecting member or beam slidably placed in a plurality of axially oriented grid member upper chambers 44. Such a connecting member provides support and relative alignment of grid members 12. Ease in assembly and disassembly/rearrangement of a ceiling grid system 10 according to the present invention is provided by axial groove 176. Axial groove 176, which may be a score line, aids in removal and/or cutting of grid member sealing portion 46.

Figure 8A:
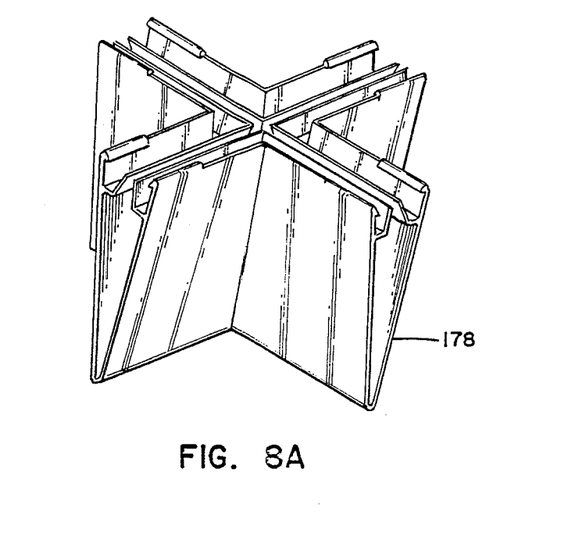
FIG. 8A is a perspective view of a preferred filter cap designed for use beneath a four-way connection of grid members.
Figures 8B, 8C, 9:
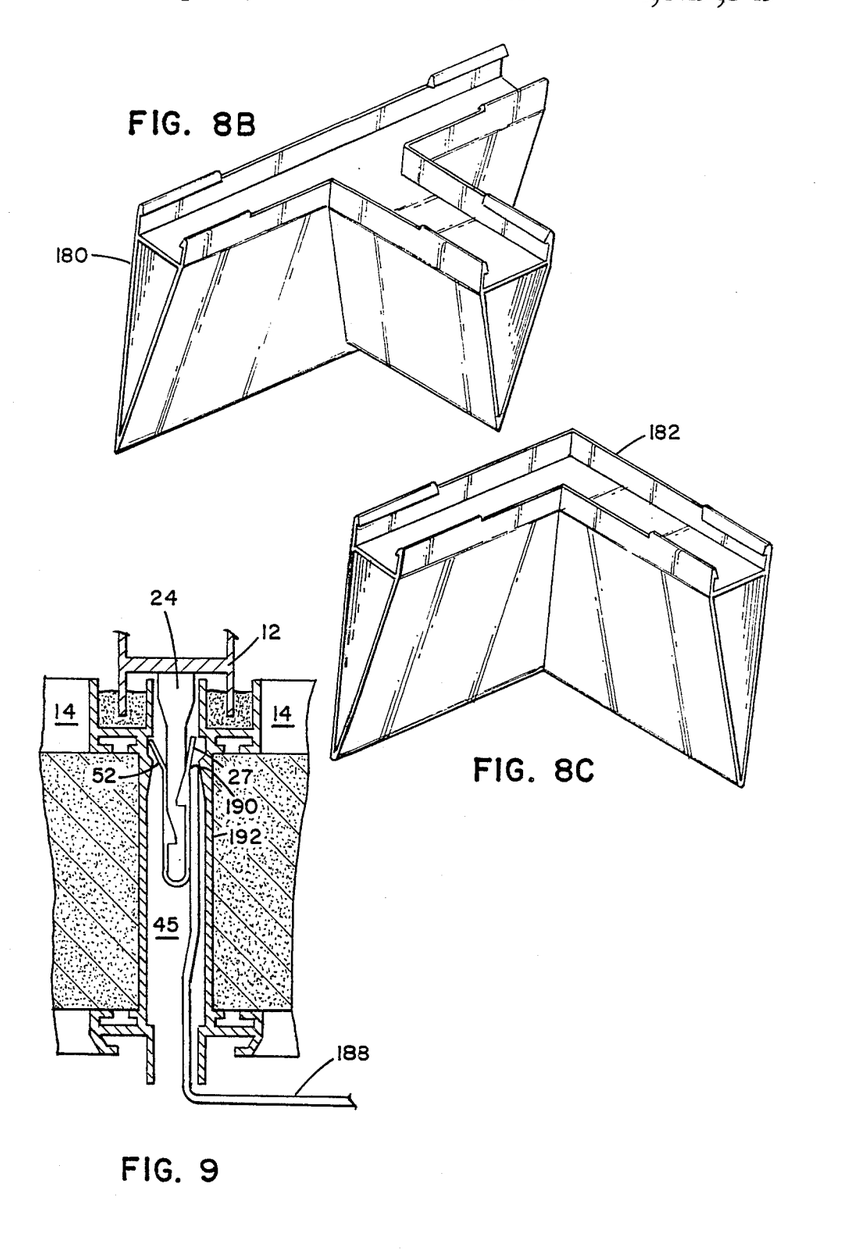
FIG. 8B is a perspective view illustrating a filter cap designed for use beneath a perpendicular intersection of two or more ceiling grid members.
FIG. 8C is a perspective view illustrating a filter cap designed for use beneath a corner intersection of two ceiling grid members.
FIG. 9 is a side cross-sectional view of a preferred ceiling grid member, two mounted filter panels, and a filter panel removing tool; the filter panel removing tool is shown engaging the filter panel ramped protrusion and the spring clip/detent means permitting removal of the filter panel.

FIG. 8A is a perspective view of a preferred filter cap 178 designed for placement beneath a four-way connection of grid members 12. Similarly, FIG. 8B is a perspective view illustrating a preferred filter cap 180 designed for use beneath a perpendicular intersection of two or more ceiling grid members 12. FIG. 8C illustrates a filter cap 182, similar to filter cap 180, designed for use beneath a corner intersection of two ceiling grid members 12.

Referring to FIG. 9, a filter removing tool 188 is, partially, shown extended vertically into grid member lower chamber 45 between filter panel 14 and filter mounting lower section 24 of grid member 12. Filter panel removing tool 188 comprises means for compressing detent mounting means 27, or spring clip filter engaging section 52, from an extended position at which filter panel 14 is supported in grid member 12 to a compressed position at which filter panel 14 is not supported by detent mounting means 27 or spring clip filter engaging section 52. As shown in FIG. 9, filter panel removing tool 188 operably engages a vertically oriented ramped protrusion 190 positioned on filter panel 14 side walls 192. Ramped protrusions 190 are positioned facing grid member filter mounting lower section 24 and operably urge filter panel removing tool 188 toward detent mounting means 27, thereby compressing detent mounting means 27 and permitting filter panel 14 to move by its own weight downward out of engagement with grid member 12 and onto filter panel removing tool 188.

Figures 10A, 10B, 11:
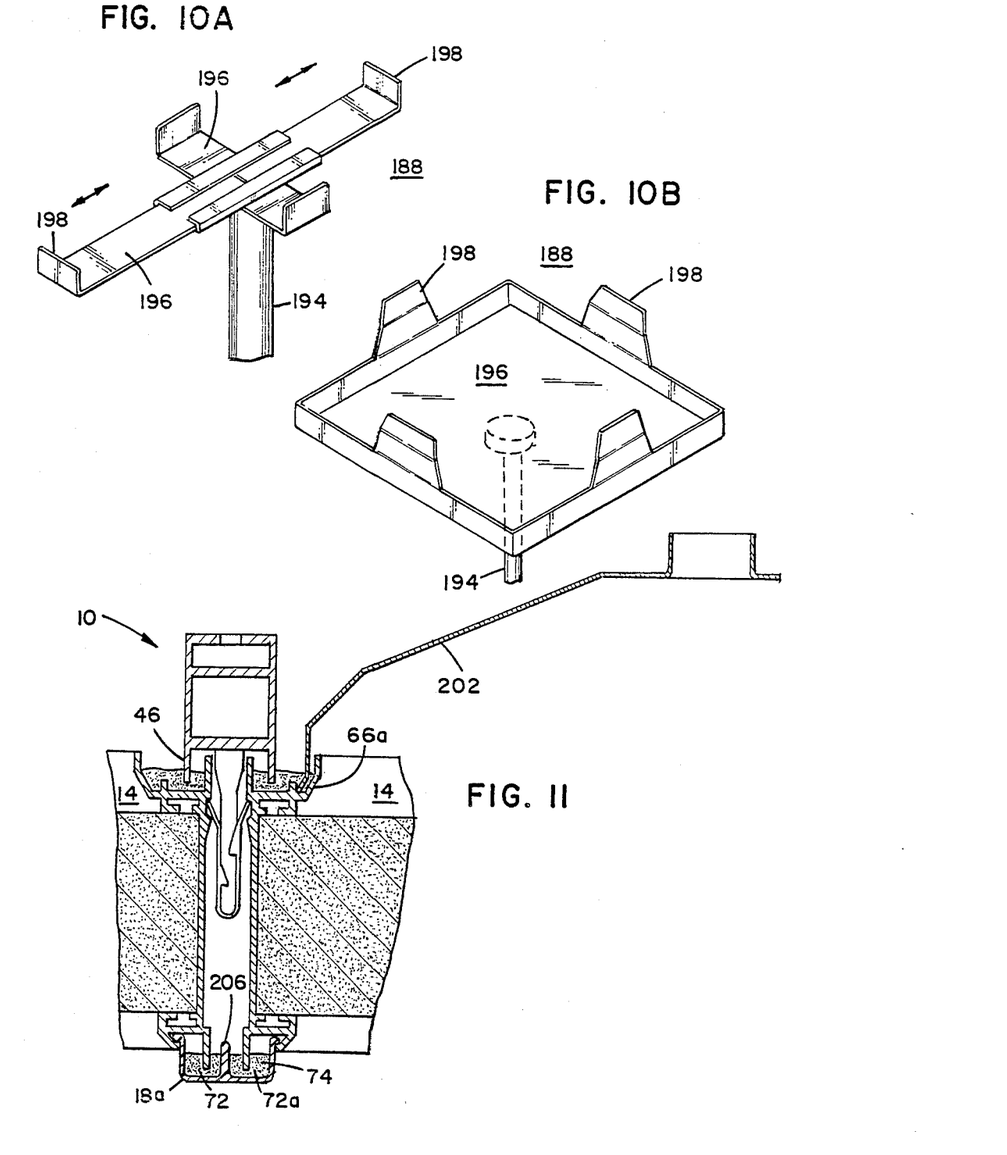
FIG. 10A is a perspective view of an adjustable filter panel removing tool.
FIG. 10B is a perspective view of an alternate filter panel removing tool constructed for removal of a filter panel of a predetermined size.
FIG. 11 is a side cross-sectional view of a preferred grid member shown supporting two filter panels with alternate embodiment upper and lower flanges; the alternate embodiment upper flange having a generally W-shaped cross-section permitting sealed cooperation with the grid member and a plenum member, and the filter panel lower flange constructed to permit an inside-mounting truncated and non-sloped filter cap having a medial spacer designed to minimize the amount of sealant material used therein.

FIGS. 10A and 10B illustrate filter panel removing tools 188 each having: a handle portion 194; at least one horizontally oriented filter panel supporting portion 196 attached to handle portion 194; and at least one spring clip positioning portion 198 attached to filter panel supporting portion 196. As illustrated in FIGS. 9, 10A, and 10B, spring clip positioning portion 198 preferably comprises a plurality of vertically oriented plates constructed and arranged for engaging ramped protrusions 190 and spring clips 28 or detent mounting means 27. FIG. 10A illustrates a filter panel removing tool 188 having means for adjusting the length of two opposing vertically oriented plates forming spring clip positioning portions 198; thereby providing a filter panel removing tool 188 suitable for removing variably sized filter panels 14.

In FIG. 11, grid panels 14 are shown comprising upper circumferential flange 66a having a generally W-shaped cross section comprising means for retaining a plenum member 202 as well as grid member sealing portion 46. Filter panel upper circumferential flange 66a permits control of supply air, which may also be pre-filtered, by sealably mounting plenum member 202 therein. Also illustrated in FIG. 11 is truncated filter cap 18a having a medially positioned spacer member 206 providing separate sealant troughs 72, 72a therein. Spacer 206 and separate troughs 72, 72a permit greater economy of sealant material 74 in use within a ceiling grid system 10 according to the present invention.

The invention accordingly consists in the features of the construction, combinations of elements, and arrangements of parts which will be exemplified in the construction described above and of which the scope of the invention would be indicated in the following claims. It is to be understood that while certain embodiments of the present invention have been illustrated and described, the invention is not to be limited to the specific forms or arrangements of parts herein described and shown.

What is claimed is:

1. A system for providing airtight/particle tight hermetic sealing of a plurality of interfacing grid members, each of said grid members having vertically oriented and horizontally oriented wall portions defining an internal chamber, and each of said grid members comprising:
   (a) an aperture extending through a wall portion of said grid member, said aperture permitting infusion of caulking compound into said grid member internal chamber proximate a first end of said grid member designed for interface with another grid member;
   (b) a plurality of protrusions located on said first end of said grid member; said protrusions permitting caulking compound leakage past said interface;
   (c) caulking stop means located within said grid member internal chamber; said caulking stop means permitting a predetermined volume of caulking compound to be infused into said internal chamber;
   (d) whereby when said predetermined volume of caulking compound is infused into said internal chamber through said aperture, an amount of caulking compound is urged out of said internal chamber past said protrusions; and,
   (e) whereby said caulking compound leakage seals said interface between said plurality of grid members.

2. A system according to claim 1 wherein said caulking stop means comprises a caulking cup, said caulking cup being constructed and arranged for insertion into said grid member internal chamber; said caulking cup including:
   (a) lip-shaped retaining means for conformal mating on said first end of said grid member;
   (b) a side portion defining an aperture, said aperture permitting infusion of caulking compound therethrough.

* * * * *